United States Patent [19]
Sugahara

[11] 3,880,266
[45] Apr. 29, 1975

[54] CLUTCH SEAL WITH FLUID OPERATED CHECK VALVE

[75] Inventor: Eisuke Sugahara, Tokyo, Japan

[73] Assignee: Nippon Piston Ring Co., Ltd., Tokyo, Japan

[22] Filed: Nov. 20, 1973

[21] Appl. No.: 417,656

[30] Foreign Application Priority Data
Nov. 23, 1972 Japan............................ 47-117582

[52] U.S. Cl.................. 192/86; 192/85 R; 137/580; 251/82
[51] Int. Cl............................................ F16d 25/00
[58] Field of Search ........... 192/85 R, 85 A, 85 AT, 192/88 A, 88 B, 86, 85 AA; 137/580

[56] References Cited
UNITED STATES PATENTS
2,242,184  5/1941  Reuter............................. 192/88 B
3,598,147  8/1971  Kosaka ............................. 137/580

FOREIGN PATENTS OR APPLICATIONS
917,464  9/1954  Germany........................... 192/88 B Primary Examiner—Benjamin W. Wyche
Attorney, Agent, or Firm—Sughrue, Rothwell, Mion, Zinn & Macpeak

[57] ABSTRACT

A fluid actuated clutch apparatus is mounted on a rotating body, such as a driving shaft of a prime mover, to selectively transmit rotation to a driven body, such as a shaft. The apparatus comprises a rotary structure or member of annular shape rigidly attached to the rotating body. A stationary structure or member of annular shape is placed about the rotary annular structure such that a chamber is formed therebetween. Fluid actuated sealing means are mounted in the stationary structure to selectively effect a seal between the rotary and stationary structures. Once the seal is effected, the fluid is directed through passages within the rotary structure to activate an inflatable friction device and transmit rotative motion to the driven body.

6 Claims, 6 Drawing Figures

CLUTCH SEAL WITH FLUID OPERATED CHECK VALVE

BACKGROUND OF THE INVENTION

1. Field of the Invention

The present invention relates to clutch actuated by fluid pressure, such as air, mounted on a rotating body, such as a driving shaft of a prime mover, to selectively transmit rotative motion to the driven body, such as a shaft.

2. Description of the Prior Art

In order to operationally transmit a driving force from a driving shaft of a prime mover to a driven shaft of a machine, an air actuated clutch is often interposed between the two shafts. For this purpose, one of the shafts is required to have an air passage and a free end so that the air supply may be connected to the air passage. This results in a restriction on the use of such devices due to the necessity of a free end and the high cost generated by the complexity of fabricating a long shaft with a longitudinal passage therethrough.

Several attempts have been made to construct a clutch which obviates the above difficulties, as exemplified by U.S. Pat. No. 3,598,147. However, these apparatuses are large and relatively complicated. As a result, they are required to have both ends supported by means of pillow blocks due to their weight and to the resultant problem of the so-called "overhang". They are also incapable of use in a restricted space due to their large size. This is predominant in a ship construction, which has a limited space between a marine engine and a screw propeller.

SUMMARY OF THE INVENTION

It is, therefore, an object of the present invention to provide an apparatus for operationally actuating an air clutch obviating the above drawbacks.

Another object of the present invention is to provide an apparatus of the above type, which is disposed around a rotating body so as not to add its own axial length to that of the total system including the rotating body, so that the overhang problem at its supporters, such as bearings, can be minimized.

According to a primary aspect of the present invention, an apparatus for supplying a working fluid, such as air under pressure, via fluid conduit to air clutch which is mounted on a rotating body together with the fluid conduit, comprises a rotary structure of substantially annular shape rigidly secured to a shaft of rotation, said rotary structure having an annular groove formed on its radially outer periphery, a stationary structure of substantially annular shape located about the annular groove of said rotary structure and spaced therefrom for allowing relative rotation of said rotary structure and for forming a chamber therebetween, two substantially annular sealing pistons mounted in said stationary structure and slidable in the longitudinal direction of said shaft of rotation, said sealing pistons being biased away from the inner side walls of said annular groove and movable, when they receive a fluid pressure, against the biasing force thereto for bringing their extending ends into sealing contact with said inner side walls to form a closed chamber in said space; a communication passage formed in said rotary structure and having its one end open into said chamber; a one-way valve mounted in said rotary structure radially inside at least one of said sealing pistons and connected with said fluid conduit and the other end of said communication passage, said one-way valve having its valve member biased into a first position for blocking communication between said fluid conduit and said communication passage; an actuating piston mounted in said rotary structure substantially in alignment with said one-way valve and slidable in said longitudinal direction, said actuating piston being biased away from said one-way valve for bringing said valve member into the first-named position and for having its extending end protruding into said closed chamber; a substantially annular discharging piston hermetically mounted in said stationary structure in a manner to have its extending end facing that of said actuating piston, said discharging piston being slidable in said longitudinal direction and biased away from one of said inner side walls, said discharging piston being movable, when it receives a fluid pressure, against the biasing force thereto for bringing the extending end thereof into abutting engagement with the extending end of said actuating piston and to said valve member into a second position in which the communication between said fluid conduit and said communication passage is allowed; and means for selectively supplying the working fluid to said closed chamber and a working fluid to said sealing pistons and to said discharging piston as the back pressures in accordance with a predetermined sequence.

DESCRIPTION OF THE PREFERRED EMBODIMENTS

Figure 1:
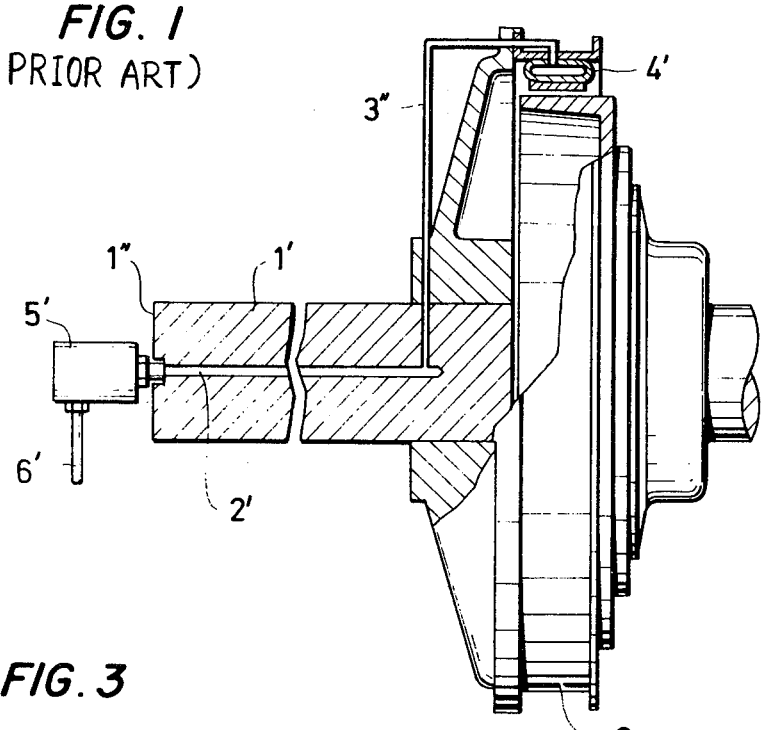
FIG. 1 is a partial longitudinal sectional view of a conventional air clutch with an air supply system therefor.

As shown in FIG. 1, the conventional fluid actuated clutch comprises a shaft 1' of rotation formed with a free end 1''. In the shaft 1'', an air passage 2' extends over a considerably long distance and has fluid communication with an expandable member 4', affixed to rotating body R, and communicating with passage 2' via a first air conduit 3''. A second conduit 6' supplies air to air passage 2' via rotational sealing device 5' located at free and 1'' of shaft 1'. The existence of the sealing device 5' at the end of the shaft 1' will make it impossible to directly connect the clutch apparatus to a driven shaft, for example, a screw shaft of a ship.

Figure 2:
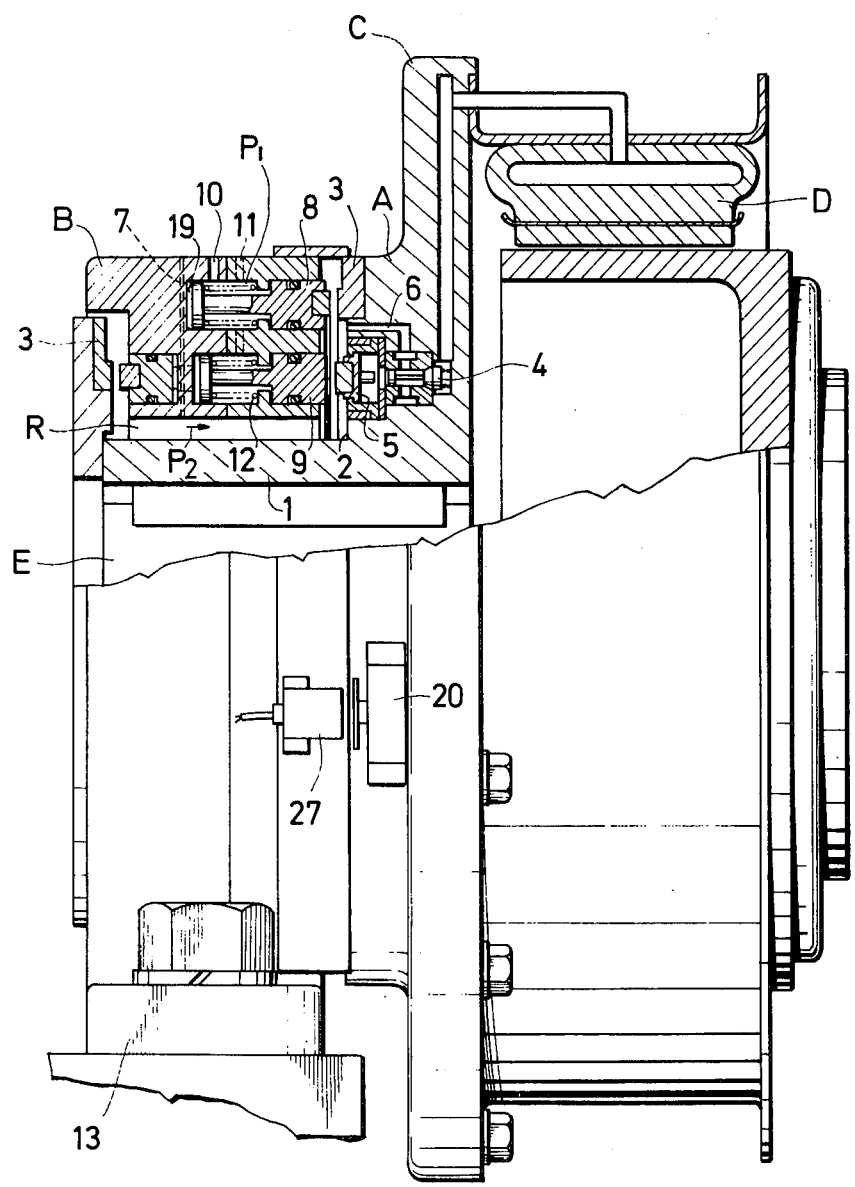
FIG. 2 is a partial longitudinal sectional view of a clutch apparatus according to the present invention.

Turning now to FIG. 2, the air supply apparatus according to the present invention is used with a rotating body such as an air clutch which requires air under pressure when in operation. The air supply apparatus generally comprises a rotary structure A and a stationary structure B. This rotary structure A has a substantially annular shape and is secured to a driving shaft E for rotation therewith, by means of a key, engaging shaft E and boss portion 1 of structure A. The structure A has rectangular cross-section groove 2 formed on its radially outer periphery. The stationary structure B is connected to a source of air under pressure via an air supply system, which will be described later. The structure B has such a substantially annular shape and is sized to be received within the annular groove 2 at a spacing therefrom to form a chamber C between structures A and B. Thus, rotation of the structure A relative to the structure B is allowed.

Figure 4:
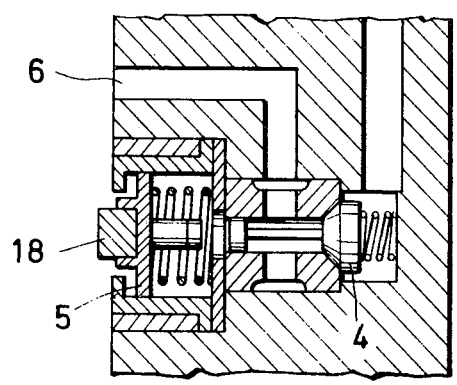
FIG. 4 is an enlarged longitudinal section showing the one-way valve and an actuating piston.
Figure 5:
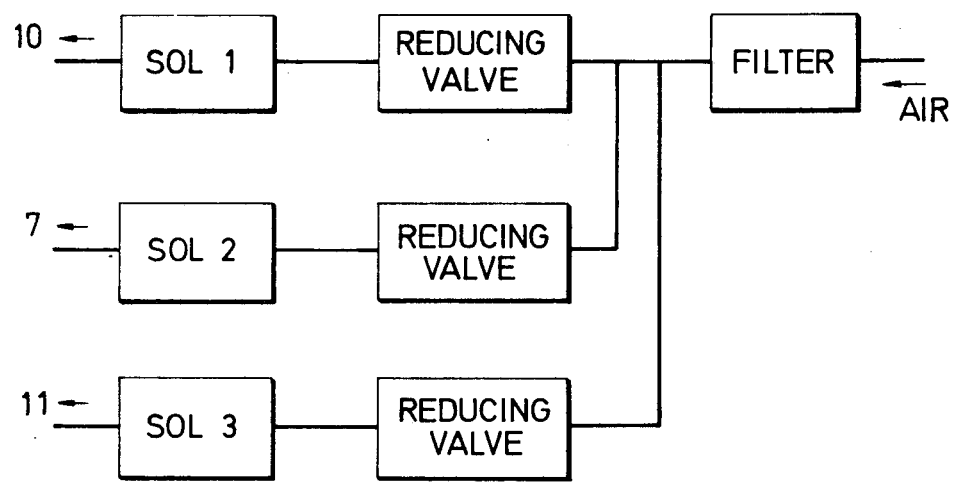
FIG. 5 is a diagrammatical view showing an air supply system for the air actuated clutch of FIG. 2.

Annular sealing elements 3 and 3' are formed at either of the inner side walls of rotary structure A. There are also provided in the structure A a one-way valve 4, a circular actuating piston 5 for moving the valve member of the one-way valve 4 in a discharging operation, and a communication passage 6 for providing communication between expandible member D and the chamber C through valve 4 and fluid conduit 28. Air supply passage 7 is formed through the stationary structure B to connect a source of pressurized air with the chamber C. Two substantially annular sealing pistons 8 and 8' are mounted in the structure B so as to face the sealing members 3 and 3' of the structure A. The sealing pistons 8 and 8' are slidable in the longitudinal direction of the driving shaft E and are biased by a springs 17 away from the sealing members 3 and 3'. Thus, the pistons 8 and 8' are movable, when they receive a fluid pressure via supply passage 10, against the biasing force of the springs 17 for bringing their extending ends into sealing contact with the sealing members 3 and 3' to thereby close chamber C. A substantially annular discharging piston 9 is also mounted in the stationary structure B so as to have its sealing end facing that of the actuating piston 5. This piston 9 is made slidable in the longitudinal direction and is biased away from actuating piston 5 by spring 12. Thus, the piston 9 is movable, when it receives a fluid pressure through supply passage 11 into chamber 31, against the biasing force of the spring 12 for bringing it into abutting engagement with the extending end of the actuating piston 5. For this purpose, the pistons 9 and 5 and the one-way valve 4 are disposed in radial alignment with each other radially inside of at least one of the sealing pistons 8 and 8'. The one-way valve 4 has its valve member biased by a spring 30 into a first position for blocking communication between the fluid conduit 28 and the communication passage 6 as shown in FIG. 4. The actuating piston 5 is biased by spring 29 away from the one-way valve 4 to place the extending end thereof into the closed chamber C. With the application of pressure through passage 11 into chamber 31, the discharging piston 9 is moved to the right, as seen in FIG. 2, into abutting engagement with the extending end of the actuating piston 5. The fluid pressure then overcomes the force of springs 29 and 30 to open valve 4 and allows communication between the fluid conduit 28 and the communication passage 6. Although only one actuating piston 5 is shown, obviously more than one may be utilized. An air supply system, shown in FIG. 5, is provided for selectively supplying air under pressure to the closed chamber C, to the sealing pistons 8 and 8' and to the discharging piston 9 via the three air supply passages 7, 10 and 11, respectively, in accordance with a predetermined sequence.

The air supply passage 7 is formed to radially extend in the stationary structure B to chamber C. This structure B is anchored to an outside support (not shown) at its foot portion 13. Both the extending ends of the sealing pistons 8 and 8' and the extending end of the actuating piston 5 may preferably be made of a sintered carbon impregnated with a synthetic resin. It should, however, be understood that the corresponding extending end of the discharging piston 9 can be made of a similar material in place of that of the actuating piston 5. The desired material is, for example, made of a sintered carbon (having a heat resistivity higher than 200° and a Shore hardness larger than 80) which is impregnated with a synthetic resin such as a silicone resin or a ethylene tetrafluoride resin.

Figure 3:
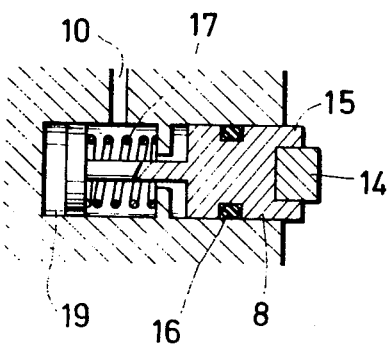
FIG. 3 is an enlarged longitudinal section showing the annular sealing piston.

As seen from FIG. 3, the sealing pistons 8 and 8' may have at their extending ends a sealing element 14 or 14' made of such a material as specified above. This sealing element 14 is held in a groove 15 of the sealing piston 8 around which an O-ring 16 is disposed for ensure sealed sliding. The spring 17 is also mounted in the piston 8, as has been described.

Turning now to FIG. 4, the actuating piston 5 may preferably have at its extending end a sealing or bearing element 18 which is made of the particular material and which has a cylindrical shape.

Reverting to FIG. 2, the sealing elements 3 and 3' which are mounted on the inner side walls of the annular groove 2 for sealing contact with the extending ends of the sealing pistons 8 and 8' are made essentially of steel with their sealing surfaces finished by polishing or lapping after having been subjected to a hardening treatment, such as a quenching process. At the same time, the sealing pistons 8 and 8' may preferably be made of an iron or copper alloy which has its sealing surface treated in the similar manner to that of the sealing elements 3 and 3' to obtain a sufficient sealing characteristic. The air supply passage 7 is formed by boring radially the stationary structure B and has pipe threads at its radially outer end for connection thereat with an outside air conduit (not shown).

When it is desired, to supply pressurized fluid to the inflatable friction member D, pressurized air $P_1$ is at first introduced into back chambers 19 in the respective sealing pistons 8 and 8' via passage 10. Then, the sealing pistons 8 and 8' are moved by the fluid pressures such that sealing elements 14 and 14' come into contact with the corresponding sealing elements 3 and 3', thus forming the closed chamber C between the two structures A and B. Subsequently, another pressurized fluid $P_2$ is introduced into the closed chamber C via the air supply passage 7. $P_2$ causes actuating piston 5 to open valve 4 and thereby allows communication between chamber C and friction element D via passages 6 and 28. When the pressure in the chamber C reaches a predetermined level, the supply of the pressurized airs $P_1$ and $P_2$ is stopped. As a result, the pressure in the closed chamber C is progressively released to bring the one-way valve 4 into the fully closed position. Thus, the air $P_2$ existing in the friction element D and in the air conduit can be confined. When it is intended to discharge or release the confined air $P_2$ from the friction element D, another pressurized air $P_3$ of relatively low pressure is introduced into a back chamber 31 of the discharging piston 9 via passage 11. Then, this piston 9 moves the valve member of the one-way valve 4 in the rightward direction through the actuating piston 5 to discharge the confined air $P_2$.

Turning now to FIG. 5, the air supply system to be employed in the present air supply apparatus comprises three solenoid valves SOL$_1$, SOL$_2$ and SOL$_3$ which are connected at the outlet side with the air supply passages 10, 7 and 11, respectively, as shown. These solenoid valves have the inlet side connected to a source of pressurized air via an air filter and via three pressure reducing valves, respectively. The operations of this system, that is, the manner in which the working fluid or the pressurized air is supplied to the passages 10, 7 and 11 are believed apparent to those skilled in the art, and their descriptions will be omitted here.

The control of the solenoid valves SOL$_1$, SOL$_2$ and SOL$_3$ is accomplished by a working pressure detecting device which will be described with reference to FIGS. 2 and 6. The control system comprises a pressure detecting device 20 which is mounted on the outer periphery of the rotary structure A for detecting a level of the pressure exerted on the friction element D. This detecting device 20 is composed of a bellows 21, a movable element including a disc 22 and a plunger 23, and a spring 24, all of which are accommodated in a cylindrical chamber 25 having communication with the expandable member D via conduit 26. An actuating device including a contactless switch 27 is mounted on the stationary structure B at a position to face the detecting device 20. Since the disc 22 of the movable element is cyclically rotated relative to the contactless switch 27, the actuating device further includes a delay device (not shown), through which the switch 27 is connected with the solenoids of the solenoid valves SOL$_1$ and SOL$_2$.

Figure 6:
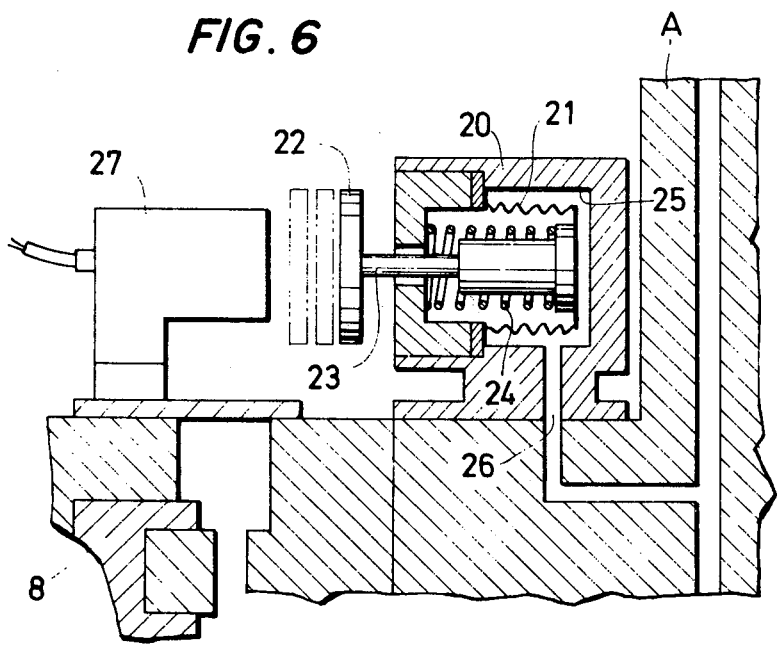
FIG. 6 is an enlarged sectional view showing the pressure detecting device for use in the clutch apparatus of FIG. 2.

When the expandable member D is occupied with air of a pressure higher than a predetermined level, the air having passed through the air conduit 26 will compress the bellows 21, so that the plunger 23 is moved leftwardly, as shown in FIG. 6 to have the disc 22 located at the position as shown by broken lines. When, in this instance, the pressure in the expandable member D is reduced for some reason to the predetermined level, then the disc 22 is shifted by the biasing action of the spring 24 to such a position as shown by solid lines. At this instant, the contactless switch 27 detects this shift to produce an electric signal. This signal is supplied to the solenoids of the solenoid valves SOL$_1$ and SOL$_2$ to terminate the fluid flow through passages 7 and 10. Solenoid valve SOL$_3$ is manually controllable and is actuated when deflation of friction element D is desired.

The advantages obtainable from the present invention over the prior art are as follows:

1. the stationary structure B is disposed around the boss portion 1 of the rotating body A so that the axial length of the clutch assembly can be reduced to almost half of that of the previous structures, and 2. the discharging piston 9 is made of an annular metal member, and the actuating piston 5 has at its extending end a cylindrical sealing element 18 made of a sintered carbon.

Item (1) means that the total length of the air supply apparatus can be minimized, and the construction of item (2) can solve the problem of wearing of the sealing element, which has been one of the most serious problems in the prior art. As to the latter advantage, more specifically, the conventional sealing has been carried out between the annular surface of the discharging piston 9 and a flat surface of the actuating piston 5. This sliding contact is of continuous nature, thus causing deterioration of the seal due to the friction heat developed. As a result, the carbon used as a material for the contact surfaces will be worn in an undesirable manner. The present invention uses an annular sealing element 18 made of a sintered carbon and brings the members into contact only when depressurization is desired to eliminate the seal wear problems of the prior art.

The annular sealing element 18 may preferably be chamferred or shaped to have a barrel-like contour. It should be emphasized here that the working fluid to be used in the present air supply system need not be limited to air.

What is claimed is:

1. A fluid actuated clutch assembly comprising:

a. a rotary structure of substantially annular shape secured to a shaft for rotating therewith, said rotary structure having a groove formed on its radially outer periphery, b. a stationary structure of substantially annular shape received within the annular groove of said rotary structure at a spacing therefrom for allowing relative rotation of said rotary structure and for forming a space in between, c. two substantially annular sealing pistons mounted in said stationary structure and slidable in the longitudinal direction of said shaft of rotation, said sealing pistons being biased away from the inner side walls of said annular groove and movable, upon application of a fluid pressure thereto, against the biasing force for bringing their extending ends into sealing contact with said inner side walls of said groove in the rotating structure to form a closed chamber in said space, d. an inflatable friction element affixed to the rotating structure, e. a passage formed in said rotary structure communicating the interior of said friction element with said closed chamber, f. a one-way valve mounted in said rotary structure radially inside at least one of said sealing pistons and connecting said chamber with said passage, said one-way valve having its valve member biased into a first position for blocking communication between said chamber and said passage, g. an actuating piston mounted in said rotary structure substantially in alignment with said one-way valve and slidable in said longitudinal direction, said actuating piston being biased away from said one-way valve, h. a substantially annular discharging piston mounted in said stationary structure in a manner to have one side facing said actuating piston, said discharging piston being slidable in said longitudinal direction and biased away from one of said inner side walls, said discharging piston being movable, upon application of a fluid pressure thereto, against the biasing force for bringing said one side thereof into abutting engagement with the actuating piston to move said piston and said valve member against the biasing forces into a second position in Which the communication between said chamber and said passage is allowed, and i. means for selectively supplying the working fluid to said closed chamber and a working fluid both to said sealing pistons and to said discharging piston in accordance with a predetermined sequence.

2. An apparatus according to claim 1, wherein both the sealing ends of said sealing pistons and the engaging sides of said actuating piston and said discharging piston are made of a sintered carbon impregnated with a synthetic resin.

3. An apparatus according to claim 1, wherein said actuating piston has an annular sealing element at its sealing end.

4. An apparatus according to claim 3, wherein said annular sealing element is made of a sintered carbon which is impregnated with a synthetic resin.

5. An apparatus according to claim 1, further comprising pressure detecting means mounted on said rotary structure for detecting a level of the pressure within said inflatable friction element.

6. An apparatus of claim 5, wherein the pressure detecting means comprises a longitudinally movable detecting element protruding toward said stationary structure, the position of said detecting element varying with the pressure within the inflatable friction element; means mounted on said stationary structure to detect the movement of the detecting element and to control the supply of fluid to said chamber and to said sealing pistons in response to the position of said detecting element.

* * * * *